(12) United States Patent
Roy et al.

(10) Patent No.: US 11,669,318 B2
(45) Date of Patent: Jun. 6, 2023

(54) RAPID SOFTWARE PROVISIONING AND PATCHING

(71) Applicant: Oracle International Corporation, Redwood Shores, CA (US)

(72) Inventors: Amit Roy, Hyderabad (IN); Samarjeet Tomar, Bangalore (IN); Prasad V. Bagal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/334,658

(22) Filed: May 28, 2021

(65) Prior Publication Data

US 2022/0382530 A1     Dec. 1, 2022

(51) Int. Cl.
*G06F 8/61*     (2018.01)
*G06F 8/65*     (2018.01)
*H04L 67/00*     (2022.01)

(52) U.S. Cl.
CPC .............. *G06F 8/63* (2013.01); *G06F 8/65* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 10,346,150 B2 | 7/2019 | Bagal et al. | |
| 11,347,696 B2* | 5/2022 | Tomar | G06F 16/1815 |
| 11,386,044 B2* | 7/2022 | Saradhi | H04L 67/60 |
| 2009/0070382 A1* | 3/2009 | Agrawal | G06F 16/16 |
| 2015/0220578 A1* | 8/2015 | Hunt | G06F 16/137 |
| | | | 707/747 |
| 2019/0095458 A1* | 3/2019 | Saradhi | G06F 16/13 |
| 2019/0236164 A1* | 8/2019 | Felts | G06F 16/164 |
| 2019/0369979 A1* | 12/2019 | Woods | G06F 16/137 |

OTHER PUBLICATIONS

Stahl, E. et al., "Performance and Capacity Themes for Cloud Computing", IBM Redpaper, (Mar. 2013), first edition.
Heyer, C. et al., "Application-Delivery Options in VMware Horizon 6", VMware, (Mar. 17, 2017), date retrieved from google.
"Verde VDI: Administration and Management Guide", Version 8.2, NComputing Global, Inc, (Feb. 15, 2018), date retrieved from google.
Monaghan, R.,"Guide to creating one Golden Image for Windows 10", Algiz Technology Limited, (May 25, 2017).
Jayaraaman, A. et al., "Oracle® Enterprise Manager: Cloud Control Basic Installation Guide", 13c Release 1, Oracle, (Mar. 2016).
Wikipedia, "Object storage", (last edited on Sep. 15, 2022).
Gavrin, A. et al., "IBM Cloud Object Storage System Product Guide", IBM Redbooks, (Nov. 2021).
Patil, A. et al., "Cloud Object Storage as a Service: IBM Cloud Object Storage from Theory to Practice", IBM Redbooks, (Mar. 2017).
U.S. Appl. No. 16/279,946, filed Feb. 19, 2019.

* cited by examiner

*Primary Examiner* — Marina Lee
(74) *Attorney, Agent, or Firm* — Vista IP Law Group, LLP

(57) ABSTRACT

Disclosed is an approach to implement an architecture and methodology that allows rapid access to provisioned software without requiring the entirety of the software distribution to be transferred to the target system in an upfront manner. Instead, a multi-tier architecture is used that allows the software to be provisioned and accessed with efficient access and reads of distribution materials from one or more remote storage locations.

21 Claims, 14 Drawing Sheets

RAPID SOFTWARE PROVISIONING AND PATCHING

BACKGROUND

In the past, software installations were commonly performed using media devices that were physically deployed to the installation site. For example, traditional software installation approaches often use media such as CD-ROMs or floppy disk devices to deliver and install software. These devices are inserted or otherwise connected to a local computing device to install the software that is contained on that media.

Today, many software vendors now employ software delivery techniques that employ network-based delivery and installation of software. For many reasons, this approach can be considered more efficient and cost-effective as compared to the approach of distributing a software on physical media. One reason is because the network-delivery approach avoids the cost of the physical media itself, as well as the requirement of a production facility to make, process, and configure the physical media. In addition, the network-based delivery of software permits more rapid provisioning of the software and any follow-up updates or changes to the software.

However, a key issue faced by users of network-based delivery of software is the latency involved in the process of having the software delivered and installed onto the local computer. Depending upon the extent and volume of materials associated with the software, a significant amount of time may be required to transfer the software materials across the network. When the same software must be installed on a large number of target systems, the cost of transferring the complete distribution accumulates. As such, this transfer latency has become the bottleneck in conventional attempts to implement rapid software deployment. This latency hampers the ability to put software patches and new releases into production in a time-efficient manner.

The software industry has often employed technologies such as containers and virtual machines for deployment. When the deployment's target is a single system, such technologies do help to reduce deployment time. However, even with these technologies, the deployment starts only when the complete software distribution has been downloaded to a target system. The size of many enterprise software may run into many gigabytes, resulting in significant distribution transfer delay during deployment. Dependencies on third party software incurs additional latencies.

Therefore, there is a need for an improved approach to perform software installations that addresses the issues identified above.

SUMMARY

The present invention provides an improved approach to facilitate network-based provisioning of software. With embodiments of the invention, an architecture and methodology are provided that allow rapid access to provisioned software without requiring the entirety of the software distribution to be transferred to the target system in an upfront manner. Instead, the inventive approach provides a multi-tier architecture that allows the software to be provisioned and accessed with efficient access and reads of distribution materials from one or more remote storage locations.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Figure 1:
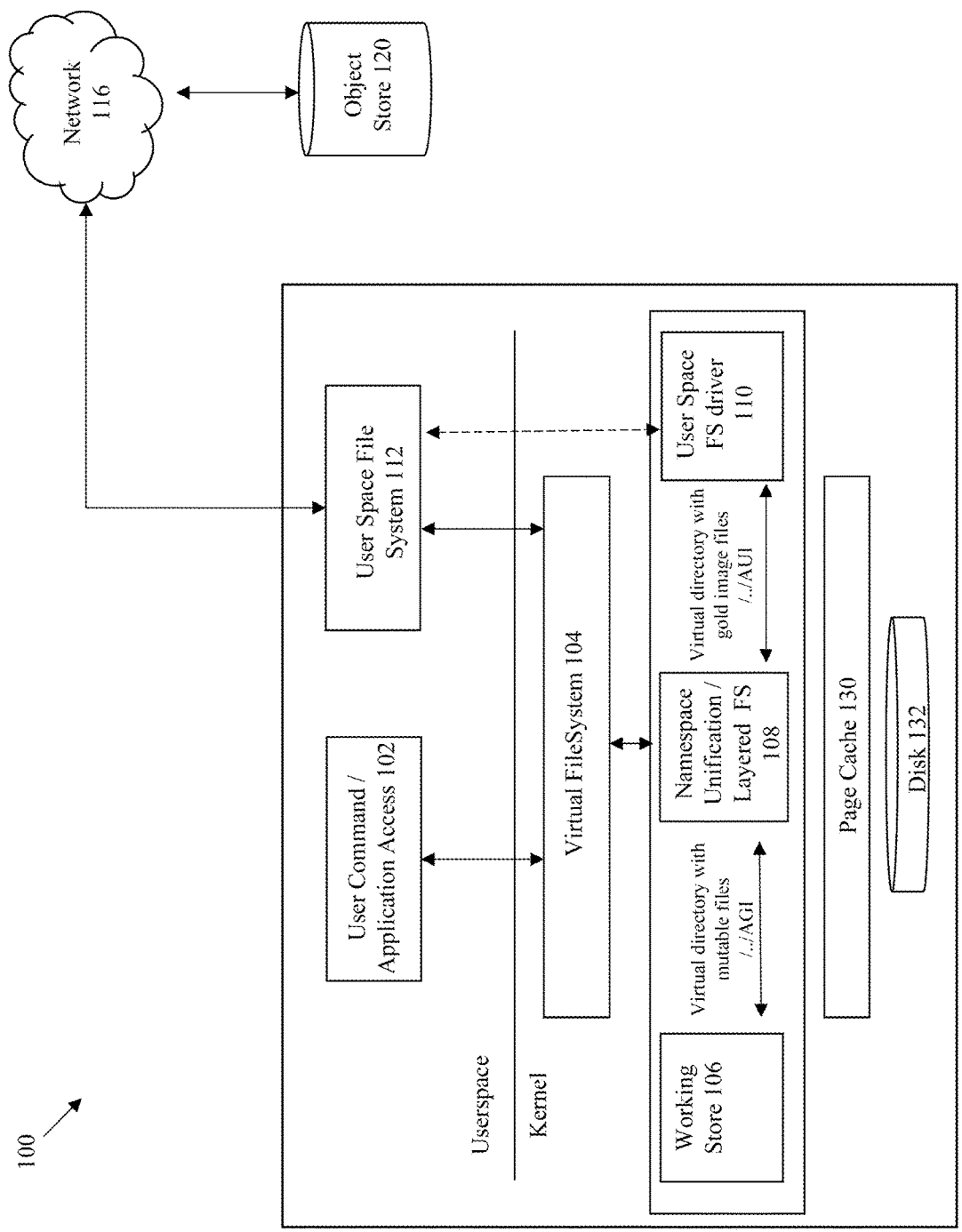
FIG. 1 provides an illustration of an architecture for implementing some embodiments of the invention.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Rapid provisioning and patching of a software stack are of crucial importance for modern software deployments, particularly for deployments of enterprise-class software. This is particularly true in a cloud environment where there is often the need to quickly provision software instances to support a diverse set of requirements, such as for example, scale out architectures to handle activity spikes, high availability (e.g., through redundancy), application mobility, multi-tenancy, and various others. In addition, considering that these applications run in highly dynamic environments where both new feature releases and critical vulnerabilities occur frequently, efficient delivery of patches is of utmost importance. The way application software and application generated data are intermixed makes it extremely challenging to update just the software as part of any patching. Moreover, rapid provisioning and patching is a critical challenge for enterprise software since distributions that may run as large as several gigabytes (e.g., for database systems) and hence just transporting these bits to a target node may incur significant delays.

The present invention provides an improved approach to facilitate network-based provisioning of software. With embodiments of the invention, an architecture and methodology are provided that allow rapid access to provisioned software without requiring the entirety of the software distribution to be transferred to the target system in an upfront manner. Instead, the inventive approach provides a multi-tier architecture that allows the software to be provisioned and accessed with efficient access and reads of distribution materials from one or more remote storage locations. The multi-tier architecture in some embodiments comprises: (1) a back end tier that hosts the complete software distribution; (2) a middle tier that connects to the back end tier and facilitates immediate reconstruction of a distribution's file hierarchy in the target node; and (3) a front end tier that provides efficient software life cycle management.

FIG. 1 provides an illustration of an architecture 100 for implementing some embodiments of the invention. In this architecture 100, the front end tier is implemented as a namespace unification/layered file system 108. As discussed in more detail below, this front end tier provides a non-invasive mechanism to separate the software bits from the application data. In particular, this tier unifies multiple directory trees such that an application—without requiring modification to its code—is able access the pertinent application materials through the current architecture. The middle tier is implemented as a user space file system 112, which provides an adapter between a hierarchical path-based file namespace and a flat object namespace. The back end tier is implemented as an object store 120 that hosts the complete software distribution.

In the back end tier that is implemented as the object store 120, the object store technology manages discrete units called objects that encapsulates both data and metadata together. Objects are identified with an identifier that may be referred to as "GUID", and are organized in a flat namespace. The objects may be accessed through an application program interface (API), such as for example, the REST API ("REpresentational State Transfer API").

The object store in some embodiments provides a scalable storage, and supports features like storage policies (geo-replication, tiering, expiry, versioning etc.) and self-healing, and furthers hardware independence. The object store has become a preferred choice for certain classes of applications like multimedia servers, archiving and backup, and WORM ("write once read many") storage. In an embodiment of the current environment, the object store is the eventual storage for the software distribution. For each file in the file system, an independent object (called File Data Object) is stored. The file system hierarchy under a mount point (e.g., the HAT mount point described below) is encapsulated in a special object called a Metadata Object. The metadata object records file-attributes such as the permission set, the ownership, and any other relevant metadata that is required to recreate the hierarchy under a mount point.

The namespace unification/layered file system 108 that forms the front end tier may also be referred to herein as an "OLFS" (online layered file system), which as discussed above, is a namespace unification file system that enables a non-invasive solution to separate out the software bits from the application data. OLFS unifies two separate directory trees under a single mount point, e.g., where the path can be referred to as the "application home". A first directory is configured to be read-only and may be referred to herein as "AUI" or "Gold Image", where this directory hosts an immutable copy of the application software. The second directory (which may be referred to herein as "AGI" or "Application Generated Image") hosts data that changes while the software is installed and while it is running in steady state (configuration files, trace logs, and any other application state). The AGI may be embodied as a working store 106 that is accessed through the system kernel.

The separation of the software and the application data allows for the software bits to be effortlessly changed without requiring any application specific knowledge. This means that the OLFS-based software lifecycle management approach combines the benefits of both out-of-place and in-place patching methodologies. It does not require changing the application home path and it reduces downtime during patching by making Gold Image generation out of band with respect to patch application. It also makes patch rollback more robust by cleanly separating application generated data from pure software bits. In some embodiments, OLFS is implemented as a kernel level file system driver. An example approach to implement OLFS is described in U.S. Patent Publication No. 2017/0115980, which is hereby incorporated by reference in its entirety.

The middle tier is implemented as a user space file system 112, which may also be referred to herein as "HAT". This tier is a user space file system that forms an adapter between a hierarchical path-based file namespace and a flat object namespace. The reason for this functionality is because object store technology has become a preferred choice for many classes of applications, but this introduces a problem if the object store needs to be accessed by an application that employs file-based access. To avoid intrusive modifications to the application to leverage the benefits of using the object store, the HAT technology is employed to interface between the hierarchically organized file system (FS) data and the flat object store namespace. With this technology, an application will be able to access flat object data as if were organized in a hierarchical way. With pertinence to the current invention, HAT is provided as the underlying architecture to implement the AUI directory tree for holding the gold image of the software.

In some implementations, the user space file system 112 forms an intermediate file system (which may also be referred to herein as a "FUSE" file system). HAT implements multiple mechanisms through its mount point. It acts as a loader by transporting all the files and the directory hierarchy under the mount point to an object store container. Following which, HAT continues to present a file system like hierarchical name space to the user while it itself accesses a flat namespace object store in the back end. In essence, all file system accesses to the mount point are served from the object store. Thereafter, HAT can recreate the same hierarchy under an empty directory in any node where the container is accessible. The file contents are then downloaded from the container on demand. With these mechanisms in place, HAT can support a number of use cases. For example, it enables applications built against file system APIs to transparently store and access objects as files. Since the object store is globally accessible, HAT also facilitates data mobility across multiple nodes so long as the application has suitable network access and its credentials are configured. HAT is implemented as a FUSE based file system.

As such, all application requests are issued to a base file system (e.g., OLFS 108). The virtual file system 104 uses the kernel driver 108 to interface with the OLFS file system. When the OLFS kernel driver seeks to access the gold image, it will call the kernel driver 110 for the user space file system 112 to access HAT. It is noted that the virtual file system in some embodiments is not a file system, but is implemented as a layer in the kernel that abstracts the specific features of various file systems. From the application point of view (in user space, e.g., the top side of VFS in FIG. 100), it publishes a uniform file system API that is consumed by all applications that want to access any file system. On the other side (from the bottom in FIG. 100), it mandates each file system to implement a uniform set of callbacks (e.g., lookup, readdir etc.).

Therefore, the current system includes a base file system, the OLFS file system driver, an intermediate file system (e.g., FUSE) that is used as the interface for accessing data after deployment of the system, and the object store. During deployment, a mount command is issued that links the base file system, and FUSE file system. Once the file systems are linked, pertinent application requests to the base file system are directed through the FUSE file system mount point.

During deployment, the temp file system is instantiated as a clone of the file system contents, but without the actual files. That is, the FUSE file system on deployment includes metadata for the directories and files of the base file system, but not the actual data. An identifier is assigned to the corresponding object in the object store and the identifier is stored as a metadata attribute with the corresponding directory in the FUSE file system. The FUSE file system may also choose to cache the on-demand downloaded objects from the object store as files under a temporary cache directory.

This structure permits the fast provisioning of software without requiring the upfront copying of all files to the target system. The system permits the user to issue a user command 102 that is received to access an application file, where the file may or may not already be copied from the object store to the target system.

When an application issues a request for a file while the files has not yet been copied to the local file system from the object store, the system determines whether the file has been copied from the object store or if it exists locally. If the file only exists at the object store, then the FUSE file system directs the request to the object store. If the file exists locally, then the local file system is used to service the request.

An example approach to implement the user space file system is described in U.S. Patent Publication No. 2020/0265023, which is hereby incorporated by reference in its entirety.

From a design perspective, although OLFS transparently separates the mutable bits of an application and allows for the AUI to be shared by multiple OLFS mount points, it still requires in some embodiments for the read only image to be copied in its entirety to every node. Since the size of these images may be fairly large (e.g., into the GBytes), this requirement saddles provisioning and patching with a non-trivial bootstrapping time overhead. HAT, on the other hand, optimizes file lookup by caching metadata in memory but incurs a network round trip overhead for every data access.

The present approach employs both the OLFS and HAT components, addresses their limitations, and provides an integrated solution for provisioning and patching. In brief, the current invention uses a HAT mount point as the AUI branch for OLFS. First, the software distribution is loaded into the object store through HAT. Thereafter, upon a mount occurring (e.g., a HAT mount), the hierarchy of the image is made available to the application immediately. Following which, files/objects are downloaded on demand (e.g., when the installer/apps accesses a file under the hierarchy). It is noted that HAT and OLFS mount points can be located either inside a VM (virtual machine), on bare metal, in conjunction with an operating system structure/context, or any combination thereof.

The present approach can be effectively used to manage any type of software distribution. As such, the present approach can be advantageously used for any application that accesses objects in the back-end, e.g., loading libraries.

Various metrics may be tracked according to some embodiments of the invention. For example, the system may track a list of files whose contents are read at the beginning of the installation. In addition, the system may track a list of files that forms the active set based on cache placement and replacement algorithms. In addition, the system may track a largest cumulative size of the active set of cached files. These metrics can be persisted in the object store (e.g., in an object named Statistics Data Object (SDO)).

Multiple types of caches can be maintained in the system, e.g., to improve performance of AUI and reduce the number of object store accesses. One possible type of cache is a metadata cache, where HAT stores file system metadata like hierarchy, attributes etc. in memory. This permits metadata accesses to effectively translate to a few memory accesses, resulting in fast lookups. Since all file system operations are preceded by a lookup, this design choice balances out the overhead due to FUSE. In addition, the system may maintain a data cache, where the local disk under the HAT mount point is used for caching file contents. Since the files persist even when HAT is unmounted, a node reboot or a remount can start with a warm cache. Additionally, the content of this cache can be copied to another node, thus reducing cold cache misses, thereby enabling faster provisioning. Furthermore, since AUI is a read only file system, multiple users can concurrently read from the cache. This cache is implemented as a single level hierarchy with all the files under the HAT mount point directory. Each file is identified with a unique number. The metadata cache keeps track of the mapping between this unique identifier and the path of the file. Local disk space usage is optimized by caching the content of a file when it is read for the first time and not when it is opened.

Figure 2:
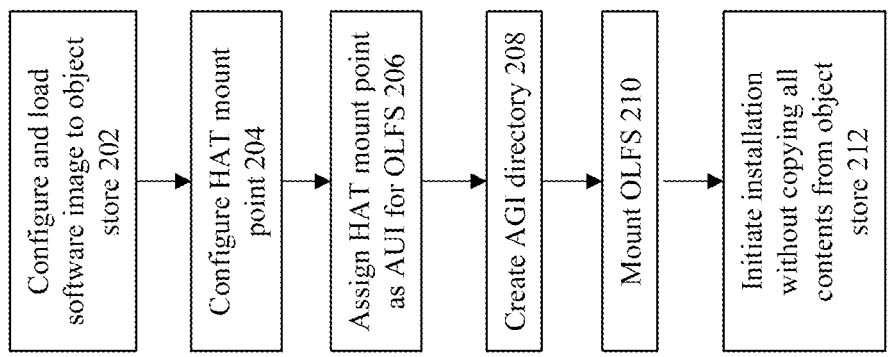
FIG. 2 shows a flowchart of an approach to implement fast provisioning according to some embodiments of the invention.

FIG. 2 shows a flowchart of an approach to implement fast provisioning according to some embodiments of the invention. This may be implement by using an external program to implement provisioning by creating all the required OLFS directories, laying down the AUI image, and then mounting the filesystem. It is noted that the software gold image may be very large, and hence file transfer itself may introduce non-trivial latency. Compression is one way of reducing the size and time of transmission.

At step 202, the object store is configured and loaded with the distribution contents. The object store may be pre-initialized with an account (e.g., tenancy), a container (or bucket) and access credentials (or Auth tokens), prior to the system deployment. These tokens are then used by the system during an access. The software distribution is initially created under a directory in a specific host, where this directory contains the complete software package (e.g., binaries, scripts, dependencies and other artifacts required to configure, link, install and run the software). The complete contents of this directory is then loaded to the object store by mounting this directory as a HAT mount point.

At step 204, the HAT mount point is configured where, after the software is uploaded, it is accessed through all HAT mount points in various nodes that connect to the same object store container. At 206, the HAT mount point is assigned as the AUI for an OLFS mount for a single host. At 208, the system creates an AGI directory and the software home (or the root directory of a software). Before mounting OLFS, the system replicates the directory tree of AUI into AGI.

At step 210, the system mounts OLFS using the AUI and the AGI directory, where the software home is now available through the OLFS mount point. Thereafter, at 212, the system initiates installation of the software. It is noted that this installation is initiated without yet copying all of the application materials to the target system, since most of the contents are still located within the object store.

FIGS. 3A-H provides an illustrative example of how a user may access application content using this architecture, even where content is not copied upfront into the local target node at the time of software installation.

Figure 3A:
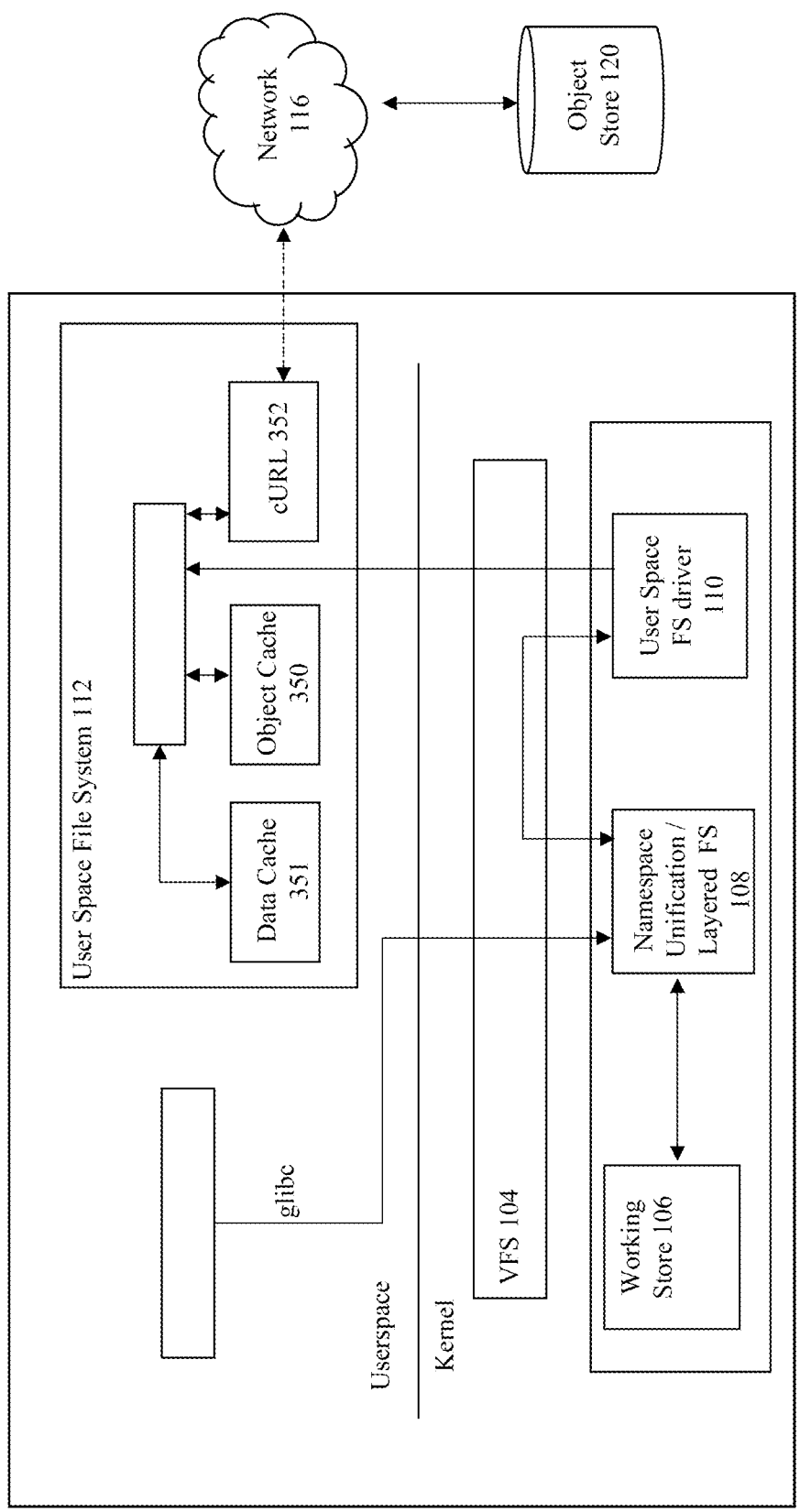
FIGS. 3A-H provides an illustrative example of how a user may access application content using this architecture, even where content is not copied upfront into the local target node at the time of software installation.

FIG. 3A shows a copy of a multi-tier architecture that was previously described in detail above. For the sake of explanation, assume that the software materials have already been loaded into the object store, and that the appropriate HAT and OLFS mount points have been created.

Figure 3B:
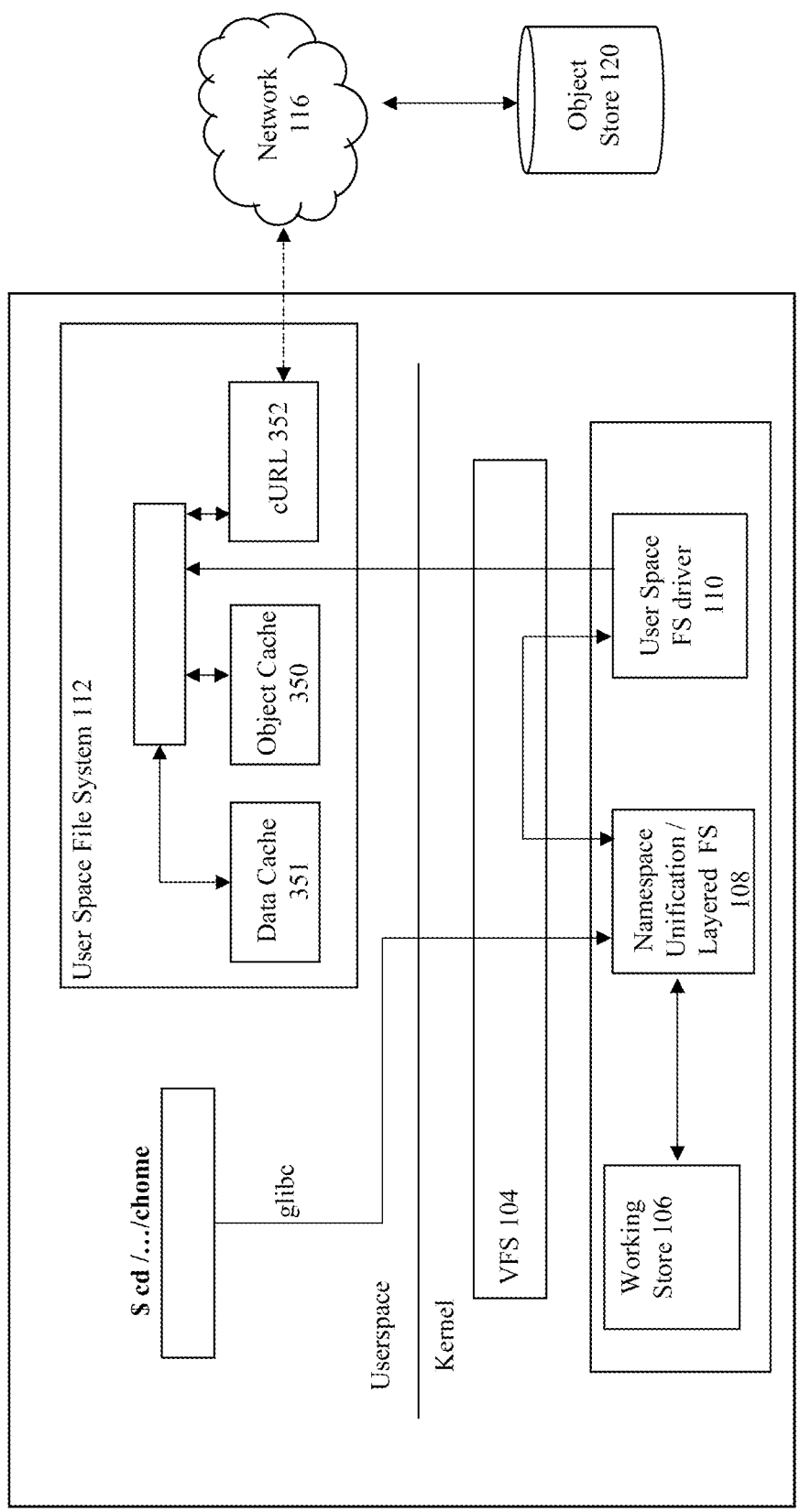

Assume that the user seeks to access a given file ("foo.txt") from the application directory or the installed software. As shown in FIG. 3B, the user will traverse to the appropriate directory (e.g., by using the "cd" command to "/ . . . /chome"). The application directory corresponds to a mount point that is recognized by OLFS and for which is accessible through OLFS to access a file within that directory.

Figure 3C:
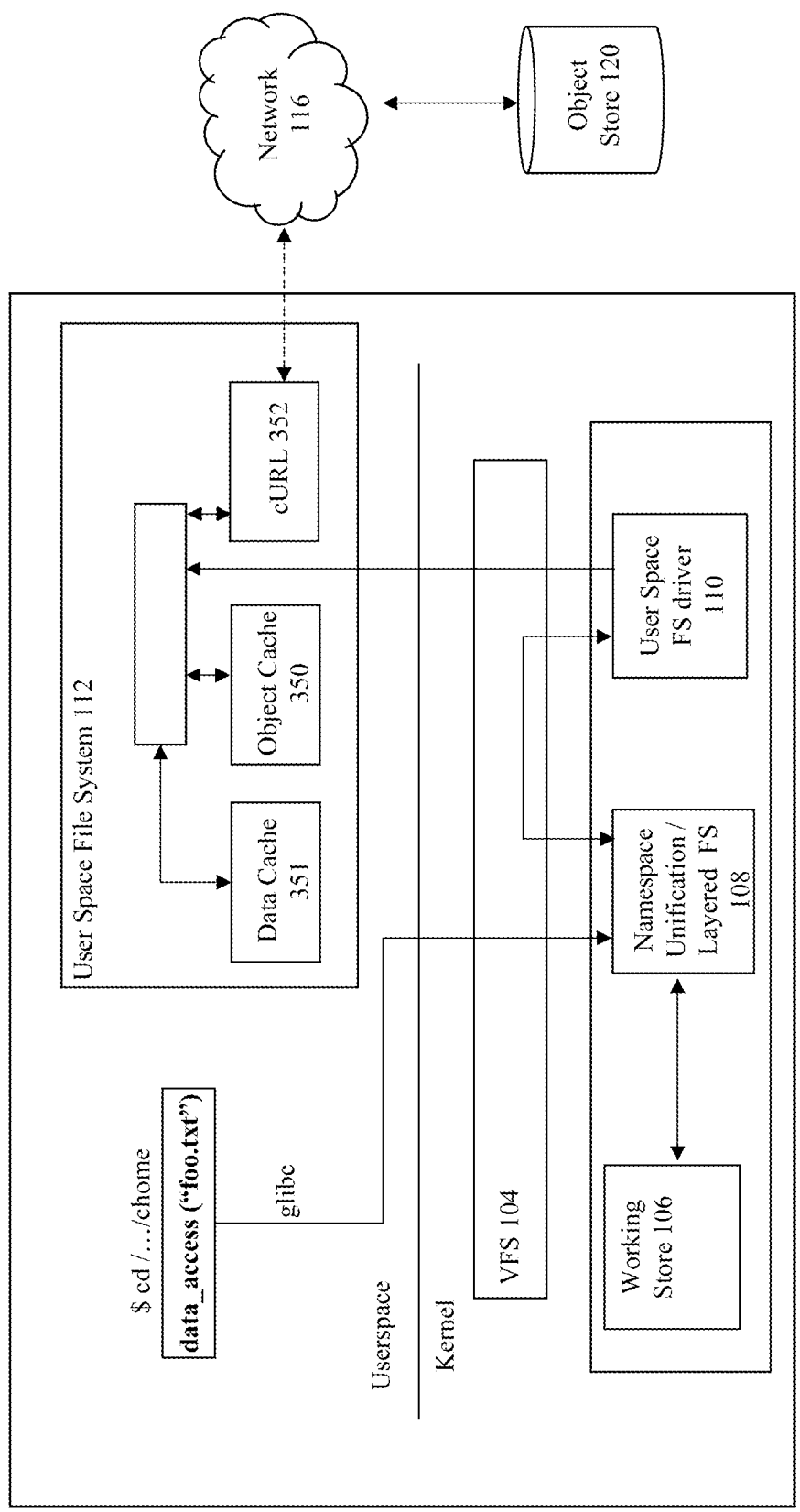
Figure 3D:
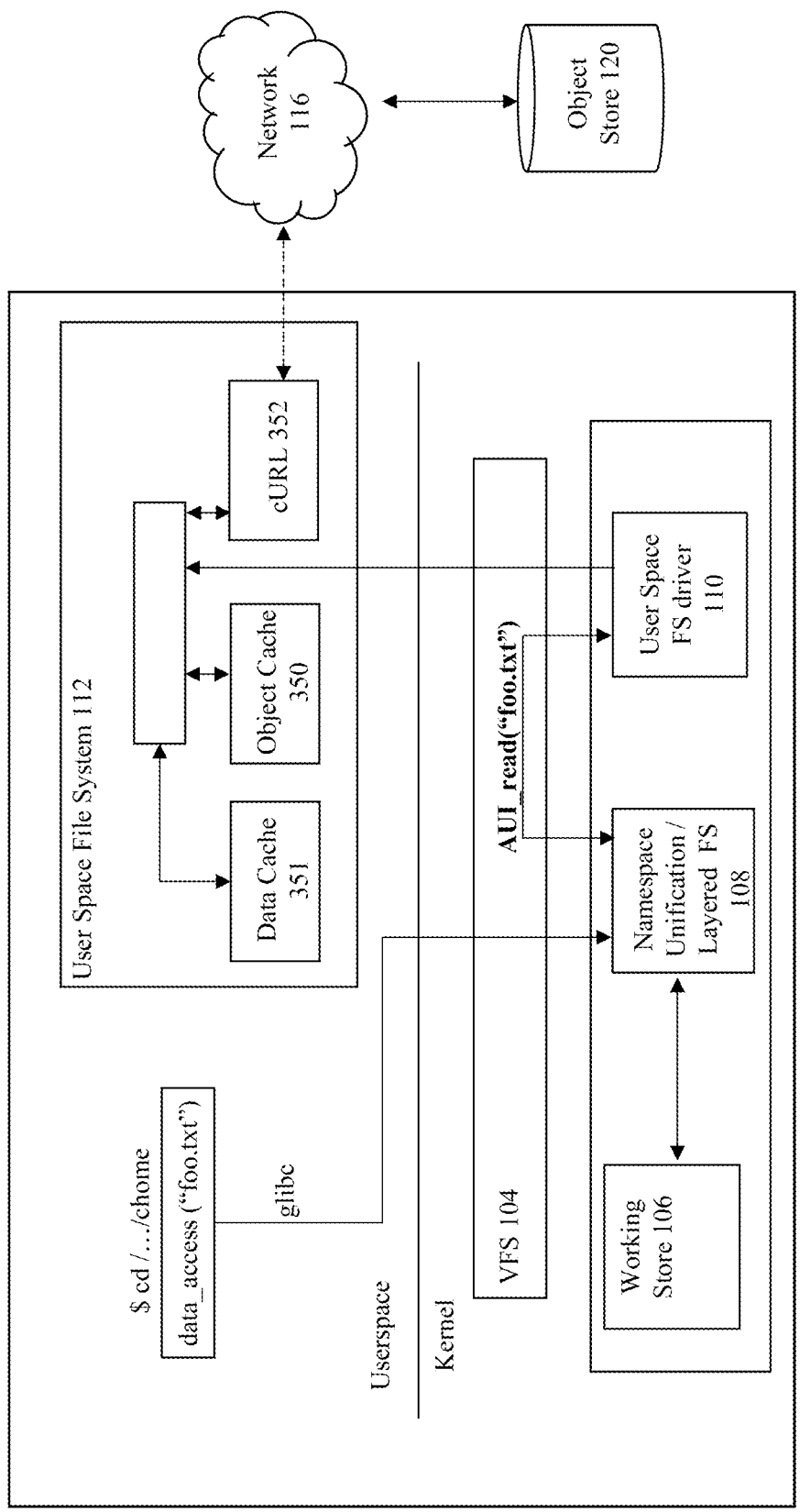

As shown in FIG. 3C, the user may issue a command to access the file "foo.txt" in the directory. At this current point in time, assume that this file has not yet been copied from the object store, and hence will need to be remotely accessed. Since the file is not yet copied (and not yet written to as a mutable object), this means that a copy of the file does not exist in the AGI directory. Therefore, the system will need to access the file from the AUI directory. With the current embodiment, the AUI directory is implemented as the HAT mount for the original contents from the object store 120. Therefore, as shown in FIG. 3D, OLFS will issue a call to the HAT driver 110 (e.g., FUSE driver) to read from the AUI directory.

Figure 3E:
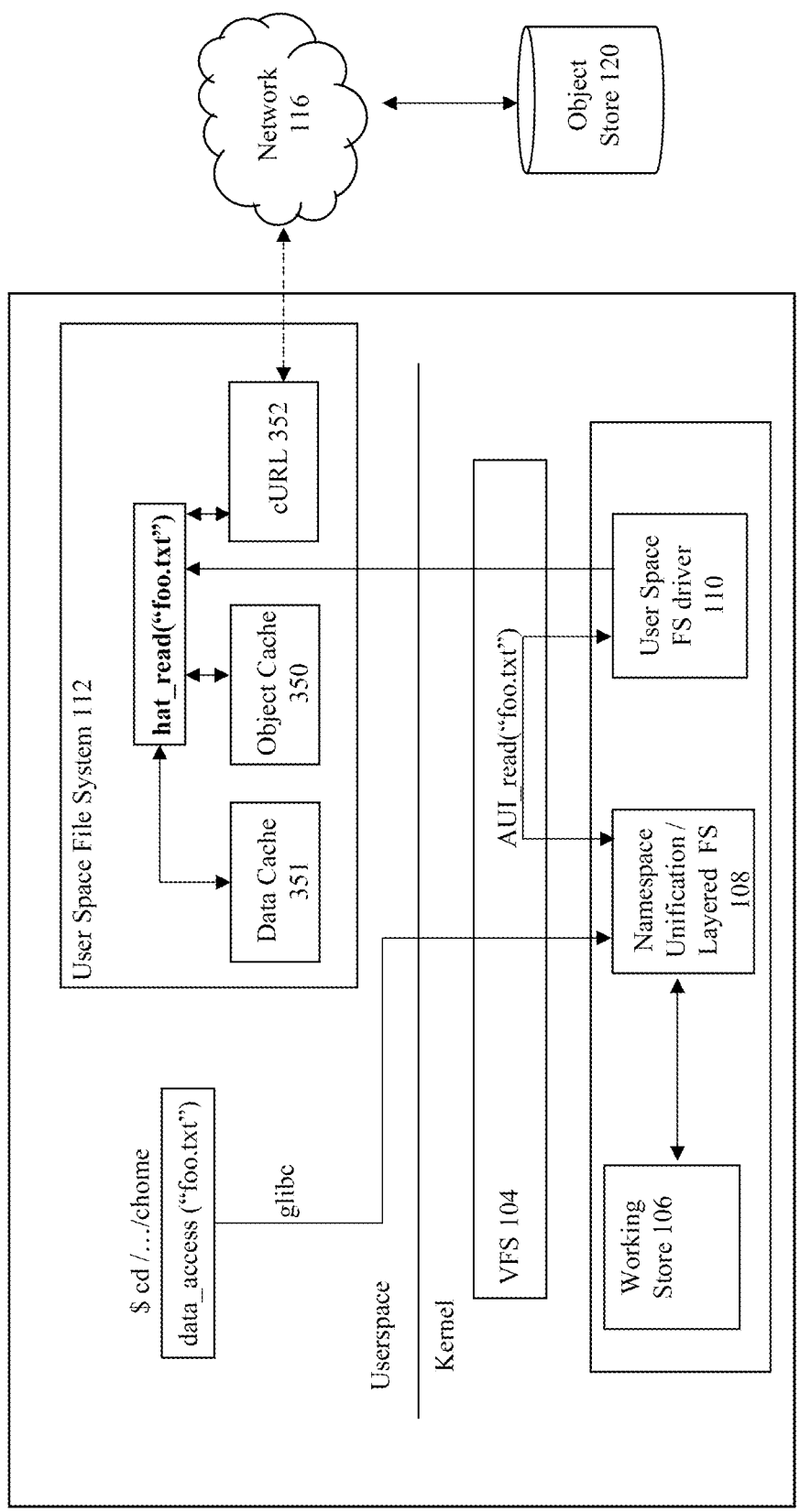

As shown in FIG. 3E, a call is placed to HAT that is embodied as the user space file system 112, which implements a call to read the file foo.txt from the appropriate HAT mount point.

Cach(es) maintained by HAT may be used during the subsequent processing. In some embodiments, there may be two caches maintained by HAT, including an object cache 350 and a data cache 351. The object cache 350 corresponds to a metadata cache that stores the file attributes and the relationships between directory and files such that the hierarchy of the base file system can be recreated under a HAT mount point. This cache also stores the mapping between a file and its corresponding object. This cache may either be stored in memory or on disk. The data cache 351 holds downloaded objects that are cached locally (e.g., on disk). This cache is under an existing directory in the local file system and the file system type could be any of the existing file systems (ext2/3/4, xfs, etc.). In some implementations, access to the data cache by HAT may involve a file system request to be sent from user space to kernel space.

Figure 3F:
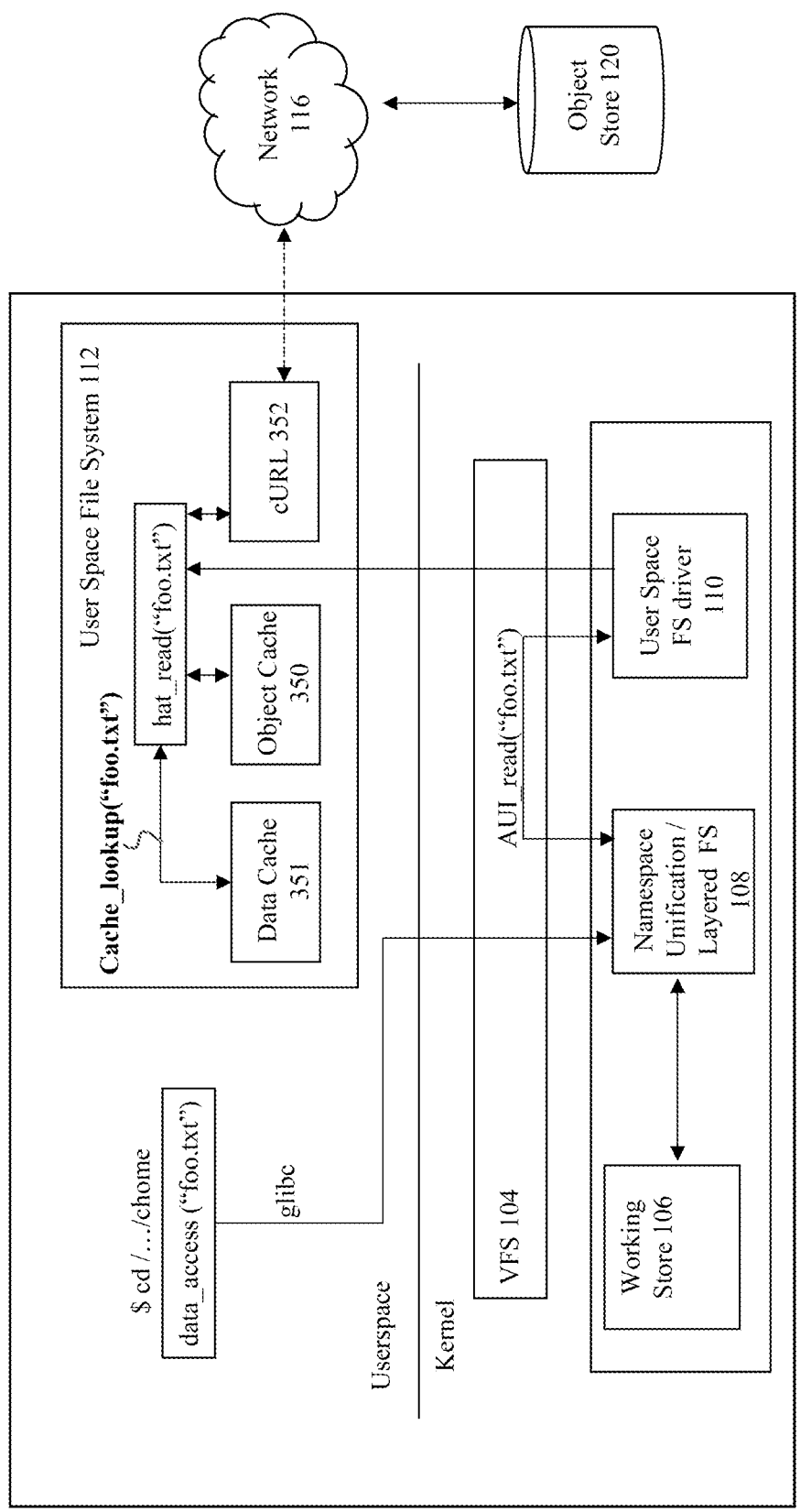

It is possible that a previous access to the file resulted in a copy of the file being previously placed into the data cache 351 in HAT. Therefore, when a file access request is received by HAT, HAT first checks if the file is available in the data cache 351. In which case, HAT opens the file and serves the file contents as part of the request. If the file is not available in the cache, HAT downloads the object into the cache, and then serves the request. As shown in FIG. 3F, a lookup operation is performed to check whether the file exists in the data cache. If so, then the file can be returned from the object cache without needing to access the object store 120 across network 116.

Figure 3G:
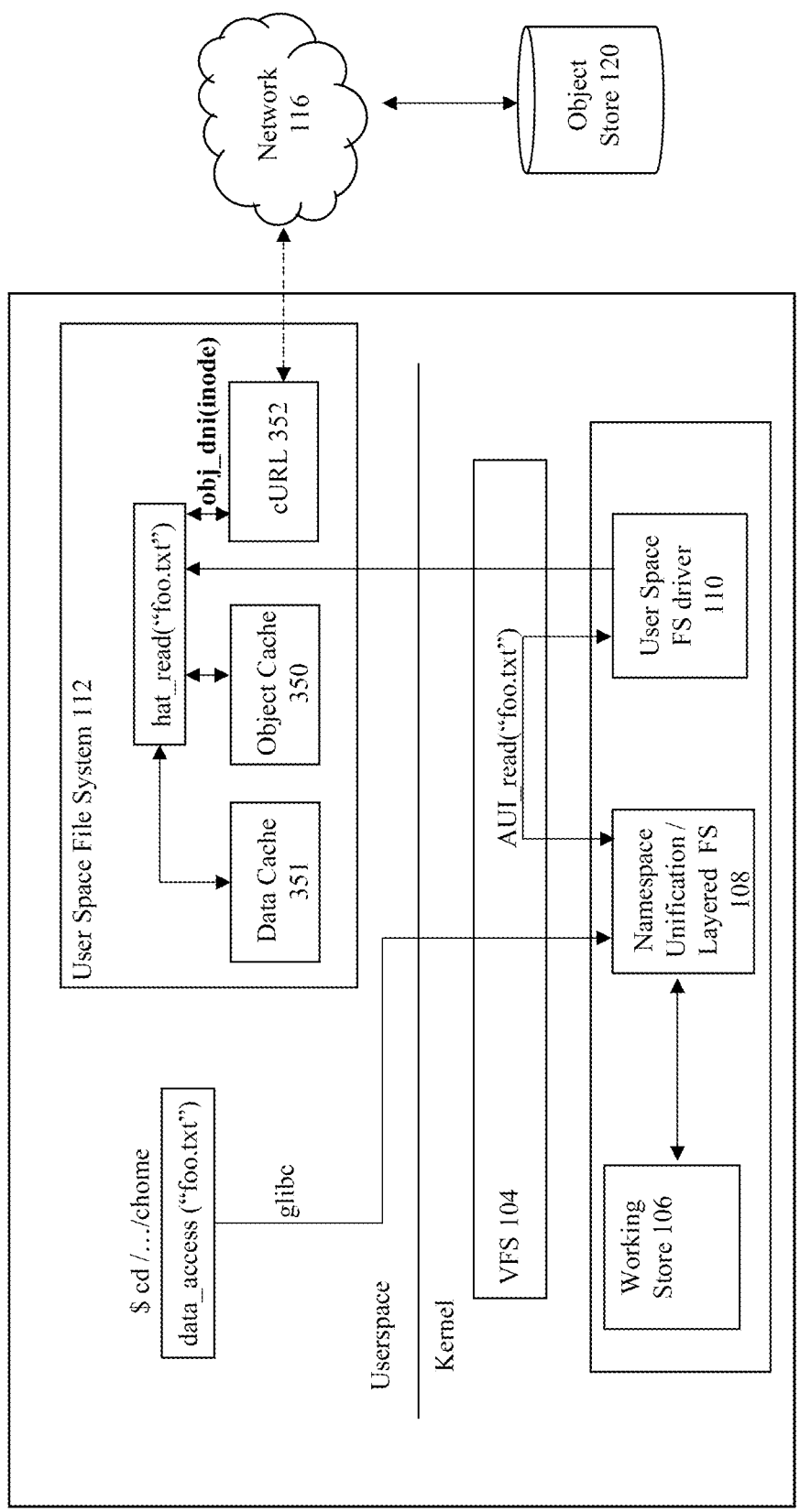
Figure 3H:
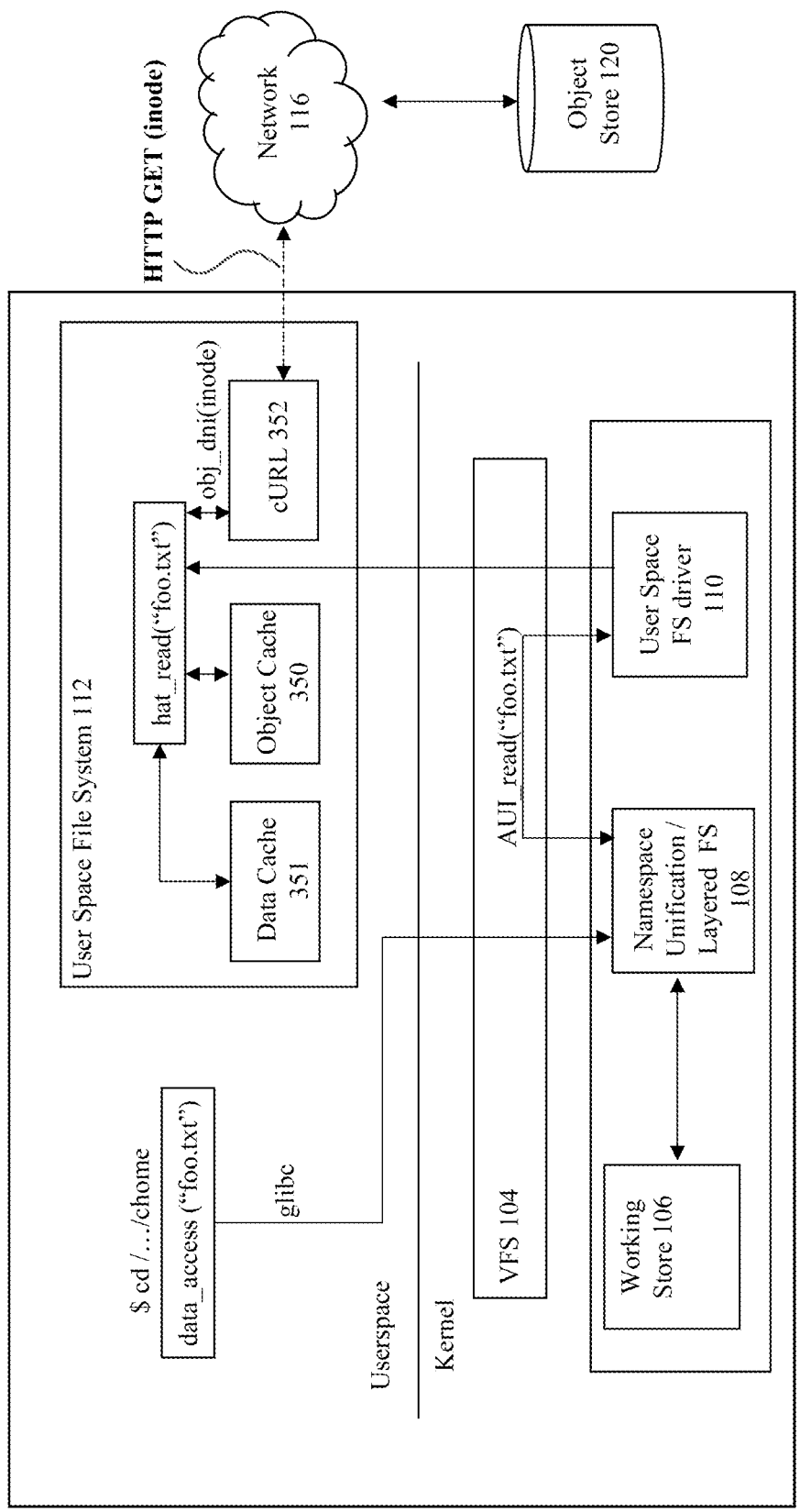

Assume that the file does not already exist in the data cache 351. In this situation, HAT will need to make a call to the object store 120 to retrieve the requested file. HAT internally includes metadata that stores mapping data for the file, e.g., metadata cached in object store 350 that maps the hierarchical namespace identifier for the file to the GUID associated with the file that would be recognizable by the object store. As shown in FIG. 3G, HAT issues the appropriate command to access the GUID for the file using the cURL module 352. As shown in FIG. 3H, an HTTP GET command is then issued to retrieve the file from to the object store 120. Thereafter, the file is retrieved and passed back to the user.

The above-described processing is performed to implement READ operations. However, a write operation is handled differently with the current embodiment, since the WRITE operation will necessarily involve the AGI directory.

Figure 4:
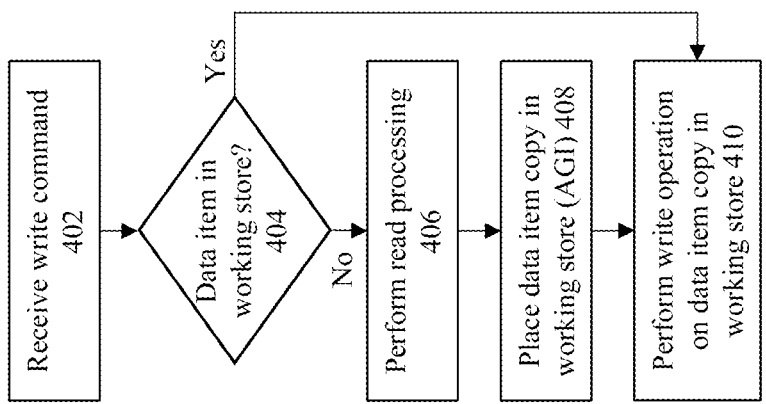
FIG. 4 shows a flowchart of an approach to implement a WRITE operation according to some embodiments.

FIG. 4 shows a flowchart of an approach to implement a WRITE operation according to some embodiments. At step 402, a WRITE operation is received from the user/application. A check is made at 404 whether the subject of the WRITE operation is currently located within the working store associated with the AGI. If the data item is already within AGI, then the process proceeds to 410 to allow the WRITE operation access the item from AGI.

If at 404 it is determined that the data item is not already within AGI, then the process proceeds to 406 to implement READ processing to obtain the data item from AUI. The READ processing is performed as described above for FIGS. 3A-H.

Figure 5:
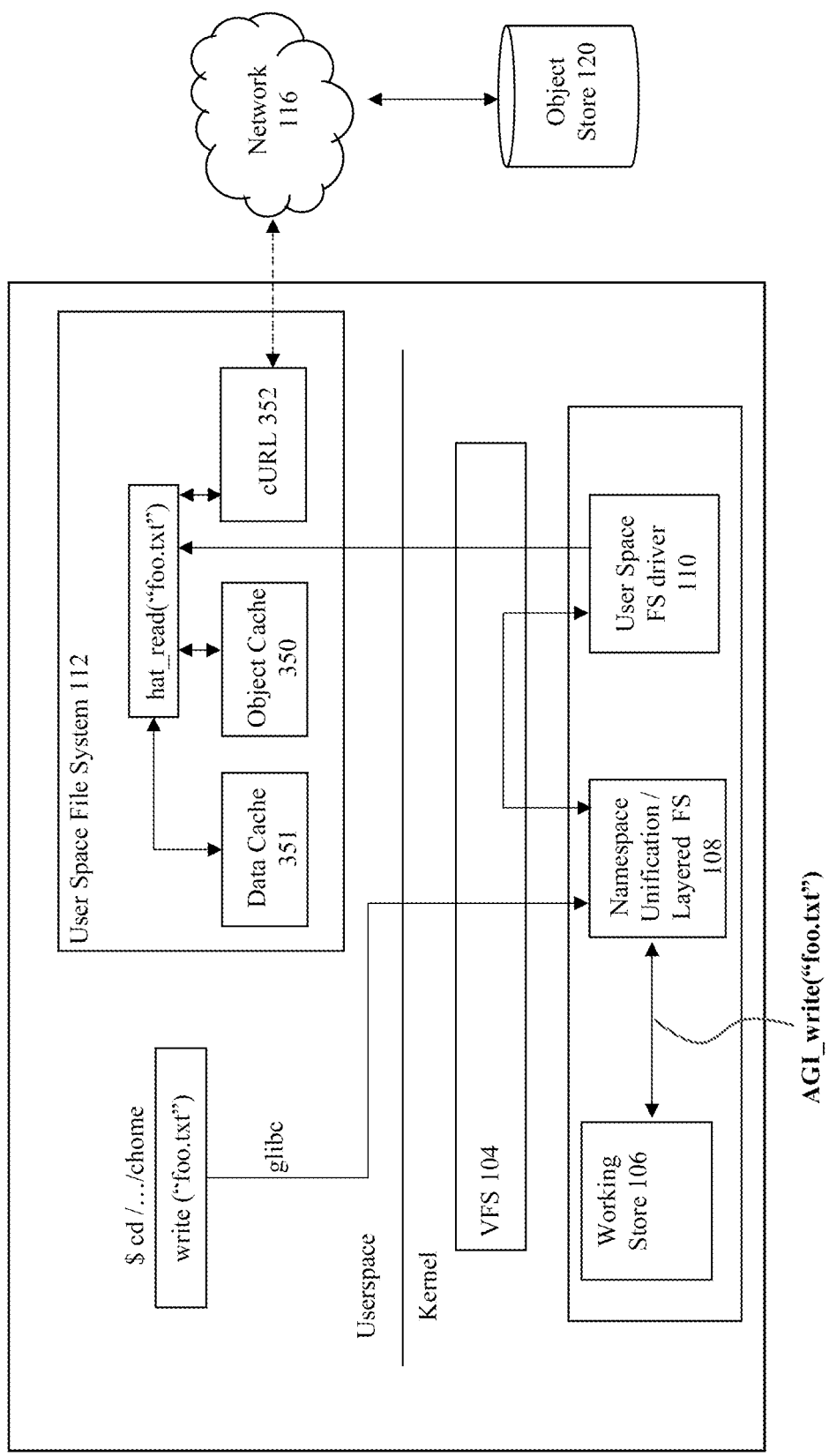
FIG. 5 illustrates the OLFS issuing a call to working store to access a data item.

Once the data item has been accessed from AGI, a copy of the data item is placed into AGI. This copy forms the mutable version of the data item. Thereafter, the process proceeds to 410 to allow the WRITE operation access the mutable version of the item from AGI. As shown in FIG. 5, this means that OLFS will issue the appropriate call to AGI to access the data item.

Afterwards, any further operations to access the data item, whether WRITE or READ operations, will be directed by OLFS to AGI to access the modified version of the data item.

It is noted that from the perspective of performing file system operations, metadata read operations (e.g. getattr) can be executed immediately after the software home is mounted. These operations are served from the HAT in-memory cache. Any immutable file data read access under the software home will redirect the calls to the AUI to HAT and then to the object store container. Following which, the file's data is downloaded and cached on the local disk maintained under the HAT mount point. Subsequent reads from the same file are served from the disk cache. Writes on the other hand downloads the file from the object store and promotes it to the AGI, thus creating a mutable copy in the local file system.

In the disclosed architecture, each node may represent any suitable entity to which the invention may be applied. For example, a node may represent either a virtual machine (VM) or a bare metal machine. In some embodiments, some or all of the nodes that make use of above architecture are in the same user namespace. Post-deployment, any access to the data and metadata is through the application home mount point.

While the above description has provided an explanation of how provisioning can be implemented, some embodiments of the invention also provide an improved approach to implement software patching. In particular, it is noted that patching can be considered a special case of provisioning, where patching closely follows the steps enumerated above to perform provisioning.

From a procedural perspective, patching is implemented by first generating the patched software, e.g., in an offline manner. Following this, the patched binary is uploaded to a new container in the object store. Thereafter, a new HAT mount point is created that now exposes the contents of the new container to the local operating system. This new HAT mount point is then paired with the existing AGI directory, and steps 206 and 208 (from FIG. 2) are executed. Finally, the running application is paused, the existing software home is unmounted, the patched home is mounted in the same home directory, and following which the application is restarted.

Any appropriate type of patching may be implemented using the current architecture. For example, as discussed above, generalized software patching is implemented by creating a new HAT AUI mount point. For rollback patching, the software home can be re-mounted using a previous base AUI and/or AGI.

Furthermore, uninstalls may be more efficiently performed by un-mounting the software home. The current architecture and methodology also provides an improved approach to change application/software configurations, e.g., by placing the component(s) having the updated configuration into the object store and making the directory structure correspond to the changed/new software configuration.

The current invention therefore provides an improved approach to implement rapid provisioning. This is because the time taken to transfer the software distribution to a target node is considered as part of the total provisioning time, and with the current embodiments, the file transfer is relegated to the background which in turn amortizes the total transfer time. The install process need not wait until the complete software distribution is downloaded in the target node, since it can start as soon as OLFS and HAT mount points are available and the empty software distribution file system hierarchy is in place. Files are downloaded from the object store on demand and cached under the HAT mount point.

Fast patching is also provided by some embodiments of the invention. Patches can be created offline and then published to an object store container. Following which, this container is mounted by HAT at an AUI directory different from the base AUI. The process of patching thus reduces to pausing the application, unmounting the software home directory, and remounting the same home directory using the base AGI and the patched AUI. Since mounting and unmounting file systems are relatively quick operations, patching downtime is contingent just on the time required to pause the application and restart it.

In addition, some embodiments provide advantages for amortized space consumption. OLFS allows for sharing of read-only AUIs with multiple AGIs, thus reducing the per install storage requirement. The current approach can be used to amortize the space utilization across a cluster of hyperconverged systems, each of which potentially hosts multiple VMs that runs the software. The complete software distribution is persisted in an object store container. A subset of this hierarchy is cached under the HAT mount point. The mutable files are stored in the AGI directory.

With regards to an object store cache, the object store is primarily a scalable but relatively slower storage solution. It may not optimized for high performance/throughput or low latency since any data access incurs a network round trip overhead. The current embodiments ameliorates this overhead by caching a subset of the software distribution's files/objects locally in the host. In essence, HAT acts either as a pass through (reads file from the cache) or as a connector to object store (downloads objects into the local cache) depending on the location of the file.

An adaptive caching strategy may also be implemented, where the current system keeps track of the file access patterns of an installation and uses that to retain the largest possible active set of files being accessed by all the software instances running in a node. An adaptive ranking algorithm may be performed, where the same strategy is used to rank files in a software installation bundle to aid prefetching from object store/remote location and expedite provisioning.

It is noted that certain software may be distributed in zipped or archived form. The current architecture allows uploading of such distributions as objects in the object store. It subsequently enables accesses to such objects stored in unzipped or unarchived form under the software install home directory.

Application mobility may also be facilitated by the current architecture/methodology, particularly for systems that are prone to failures or require load balancing the nodes. Since the backend is globally accessible, the current approach makes the software distribution available to all nodes. This ability in conjunction with the capability to rapidly provision allows for a low downtime while application is relocated between nodes.

The present invention also provides transparent support for multi-tenancy, which is a particularly desirable feature to achieve efficient resource utilization. The AUI may be paired with multiple AGIs, thus reducing the storage foot print of software distributions. The current architecture can leverage this to provide for the HAT mount point (e.g., the AUI) to be made available on bare metal and where each of the AGIs resides in a VM. Thus, multiple VMs running the same software instance, accesses the same software distribution while maintaining their individual mutable bits inside the VM.

System Architecture

Figure 6:
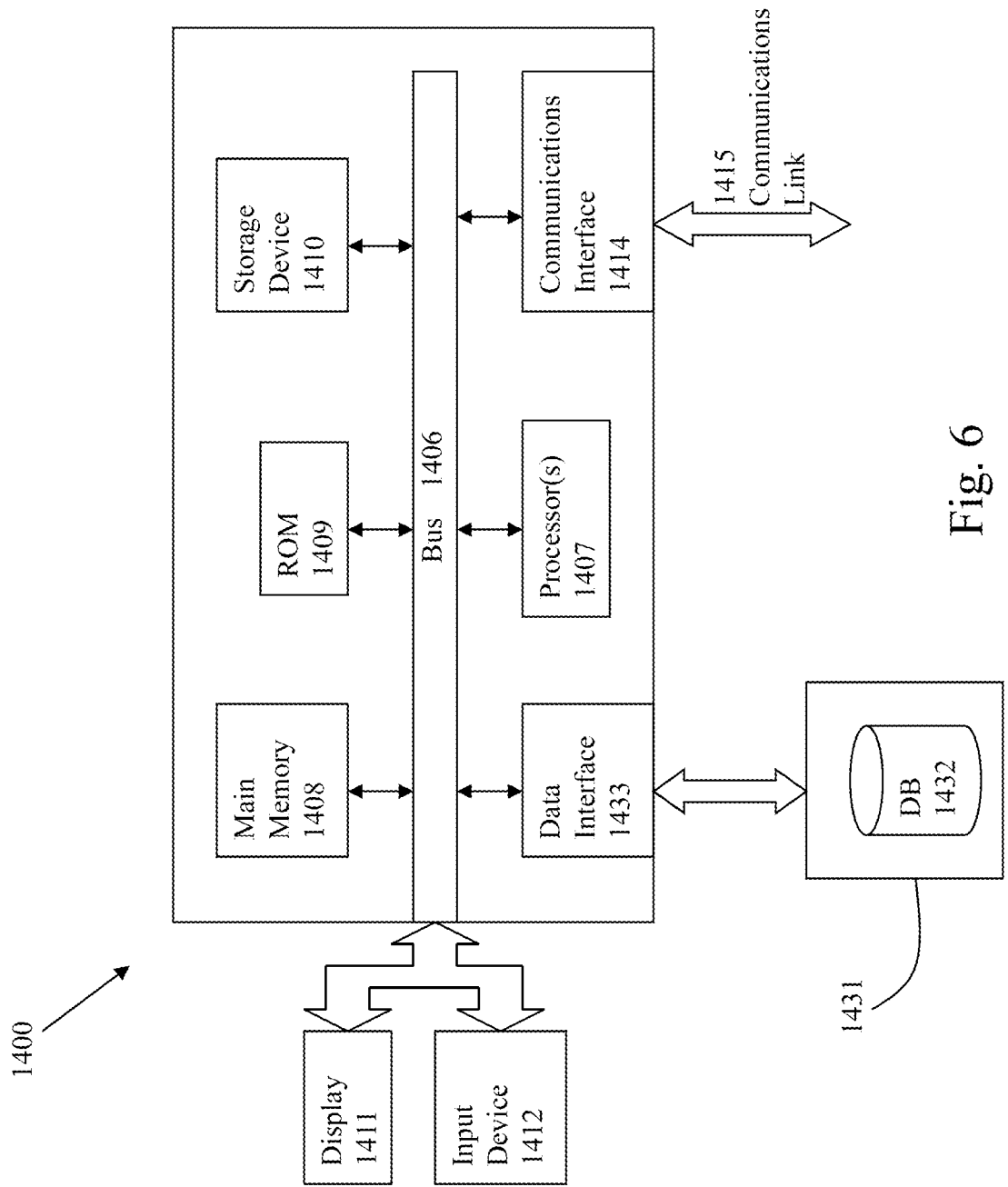
FIG. 6 is a block diagram of an illustrative computing system suitable for implementing an embodiment of the present invention.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface

1414 (e.g., modem or Ethernet card), display 1411 (e.g., CRT or LCD), input device 1412 (e.g., keyboard), and cursor control.

According to some embodiments of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1410 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 7:
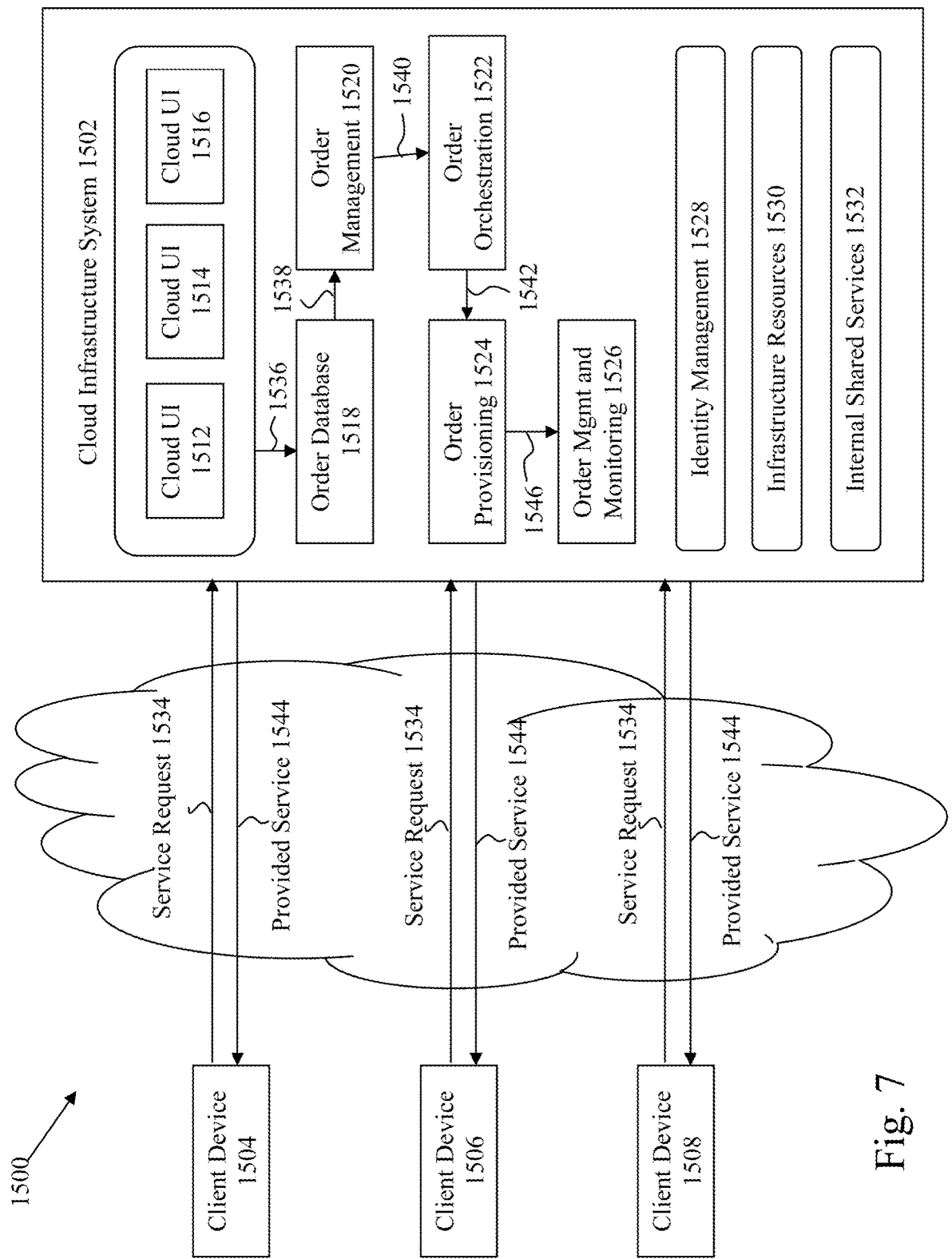
FIG. 7 is a block diagram of one or more components of a system environment in which services may be offered as cloud services, in accordance with an embodiment of the present invention.

FIG. 7 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for FIG. 6. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloudservices via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1502 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1518 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
    providing a multi-tier architecture, comprising:
        a front-end tier having a namespace unification file system corresponding to a first directory for mutable files and a second directory for gold image files;
        a middle tier having a user space file system mapping between a hierarchical filesystem namespace for the front-end tier and an object namespace for a back-end tier;
        the back-end tier having an object store, wherein the object store holds objects for a software distribution;
    loading the software distribution into the object store; and
    performing software provisioning without transferring all of the software distribution to a target node.

2. The method of claim 1, wherein a write operation is performed on an object by transferring a copy of the object to the first directory for mutable files.

3. The method of claim 1, wherein a read operation is performed on an object by accessing the object from a second directory through the user space file system to retrieve the object from the object store.

4. The method of claim 3, wherein caching is performed to cache a copy of the object.

5. The method of claim 1, wherein patching is performed by placing patched software into the object store, and creating a new mount point for the user space file system that maps to the patched software.

6. The method of claim 1, wherein the software distribution is unmounted by a mount point for the software distribution.

7. The method of claim 1, wherein the second directory for gold image files is shared amongst multiple virtual directories for mutable files.

8. A computer program product embodied on a non-transitory computer readable medium, the non-transitory computer readable medium having stored thereon a sequence of instructions which, when executed by a processor, executes:
    providing a multi-tier architecture, comprising:
        a front-end tier having a namespace unification file system corresponding to a first directory for mutable files and a second directory for gold image files;

a middle tier having a user space file system mapping between a hierarchical filesystem namespace for the front-end tier and an object namespace for a back-end tier;

the back-end tier having an object store, wherein the object store holds objects for a software distribution;

loading the software distribution into the object store; and performing software provisioning without transferring all of the software distribution to a target node.

9. The computer program product of claim 8, wherein the sequence of instructions further executes a write operation that is performed on an object by transferring a copy of the object to the first directory for mutable files.

10. The computer program product of claim 8, wherein the sequence of instructions further executes a read operation that is performed on an object by accessing the object from a second directory through the user space file system to retrieve the object from the object store.

11. The computer program product of claim 10, wherein the sequence of instructions further executes caching that is performed to cache a copy of the object.

12. The computer program product of claim 8, wherein the sequence of instructions further executes patching that is performed by placing patched software into the object store, and creating a new mount point for the user space file system that maps to the patched software.

13. The computer program product of claim 8, wherein the software distribution is unmounted by a mount point for the software distribution.

14. The computer program product of claim 8, wherein the second directory for gold image files is shared amongst multiple virtual directories for mutable files.

15. A system, comprising:

a multi-tier architecture comprising one or more computing devices, wherein the one or more computing devices include respective memory for holding instructions and respective one or more processors that executes one or more sequences of instructions which, when executed by the respective one or more processors, causes the respective one or more processor to implement a front-end tier, a middle tier, and a back-end tier, wherein:

the front-end tier comprises a namespace unification file system corresponding to a first directory for mutable files and a second directory for gold image files;

the middle tier comprises a user space file system mapping between a hierarchical filesystem namespace for the front-end tier and an object namespace for a back-end tier;

the back-end tier comprises an object store, wherein the object store holds objects for a software distribution; and the object store holds the software distribution, and software provisioning is performed without transferring the entirety of the software distribution from the object store to a target node.

16. The system of claim 15, wherein a read operation is performed on an object by accessing the object from a second directory through the user space file system to retrieve the object from the object store.

17. The system of claim 15, wherein a write operation is performed on an object by transferring a copy of the object to the first directory for mutable files.

18. The system of claim 17, wherein caching is performed to cache a copy of the object.

19. The system of claim 15, wherein patching is performed by placing patched software into the object store, and creating a new mount point for the user space file system that maps to the patched software.

20. The system of claim 15, wherein the software distribution is unmounted by a mount point for the software distribution.

21. The system of claim 15, wherein the second directory for gold image files is shared amongst multiple virtual directories for mutable files.

\* \* \* \* \*